Dec. 23, 1952     C. A. BOEHM     2,622,454
AUXILIARY TRANSMISSION MECHANISM FOR MILLING MACHINES
Filed Aug. 9, 1950     7 Sheets-Sheet 1

INVENTOR.
CARL A. BOEHM
BY
H. K. Parsons & L. W. Wright
ATTORNEYS

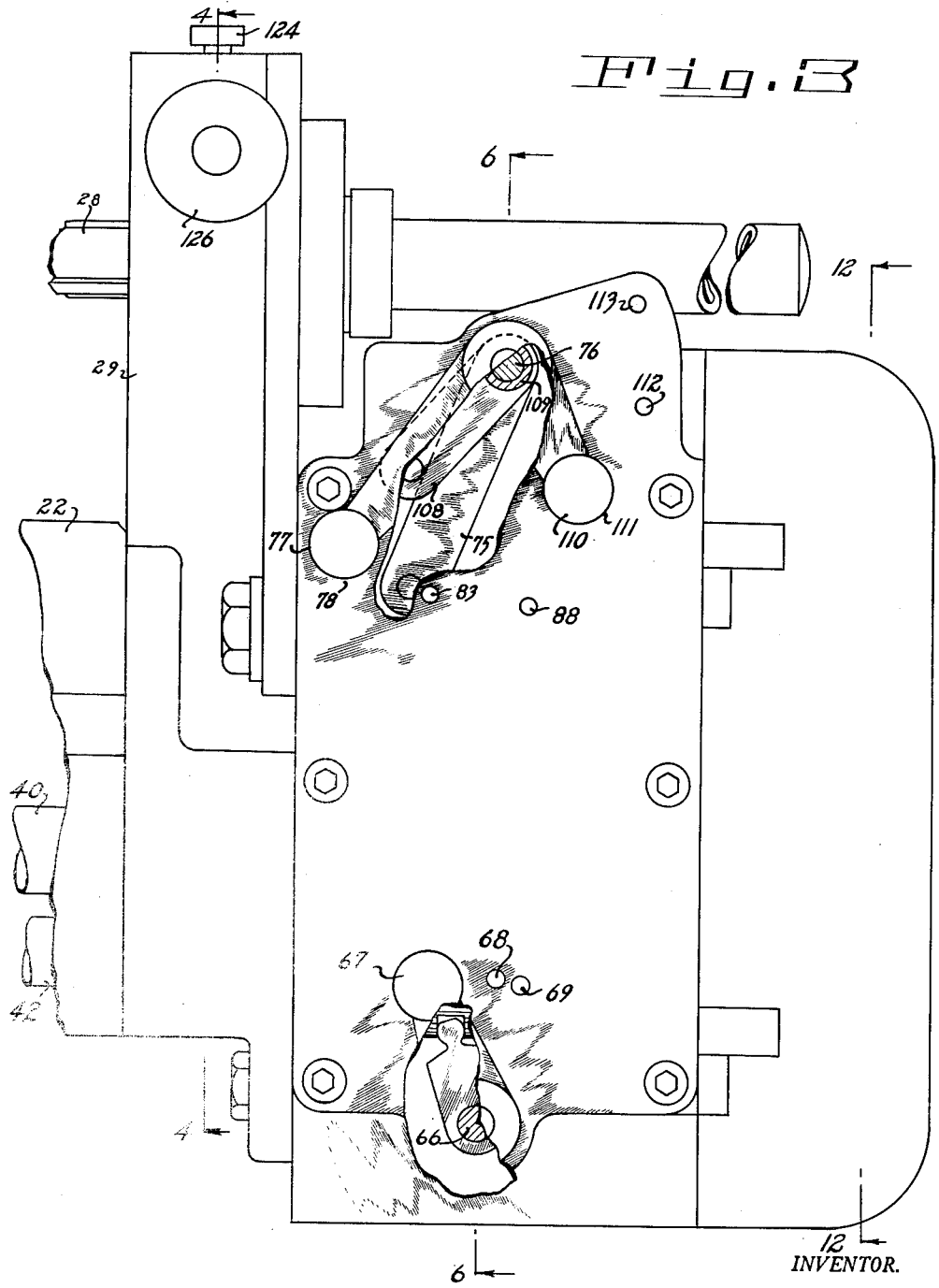

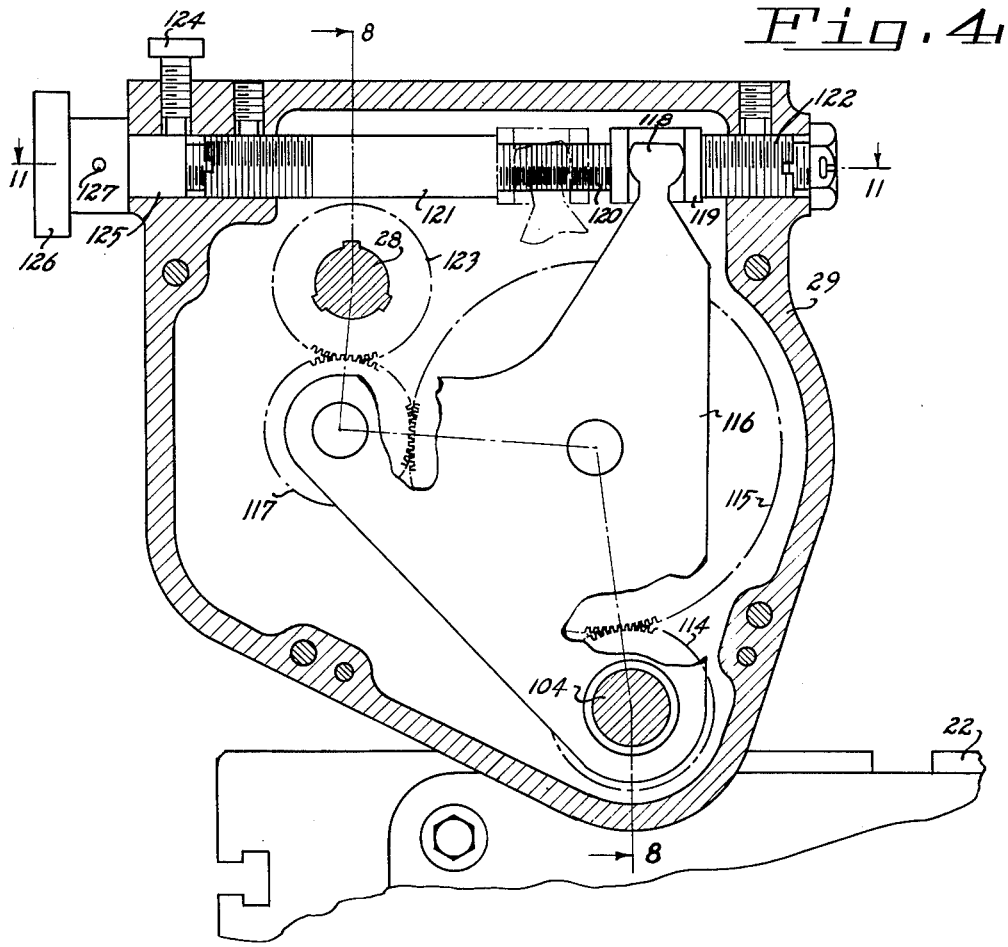
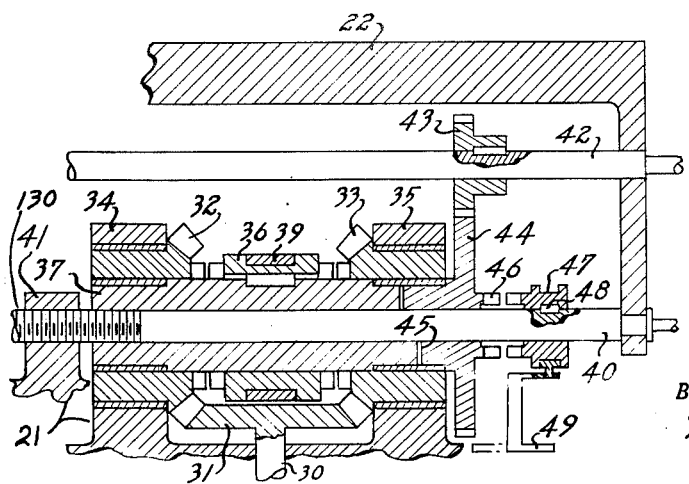

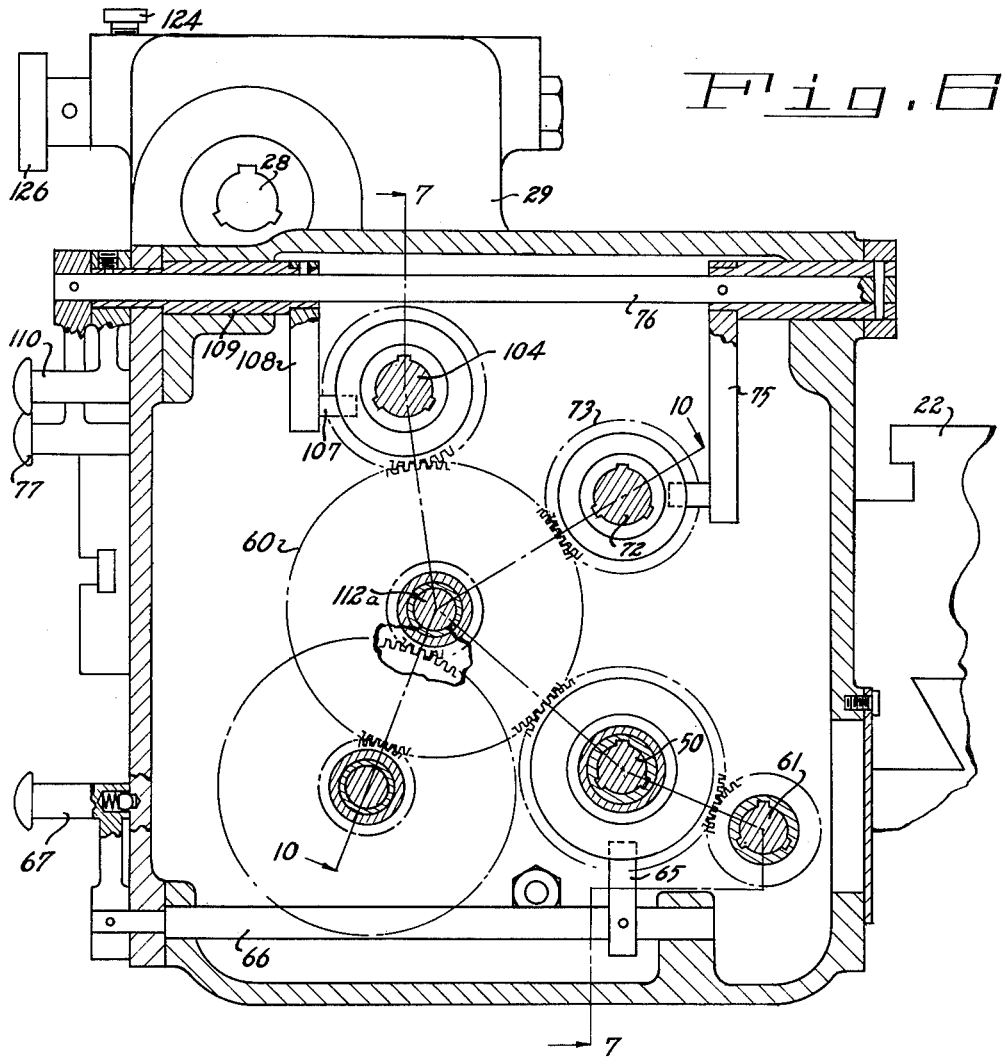

Dec. 23, 1952  C. A. BOEHM  2,622,454
AUXILIARY TRANSMISSION MECHANISM FOR MILLING MACHINES
Filed Aug. 9, 1950  7 Sheets-Sheet 5
Fig. 7
Fig. 9
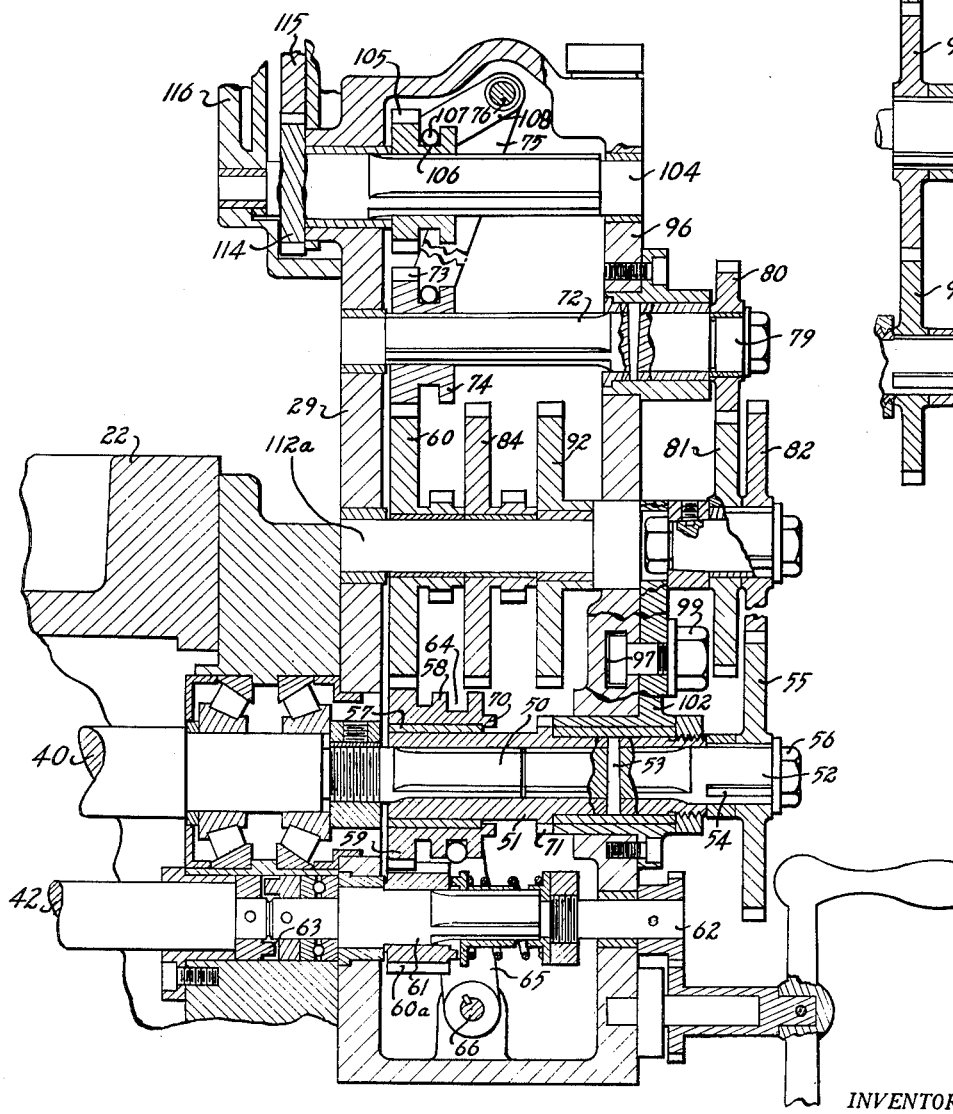
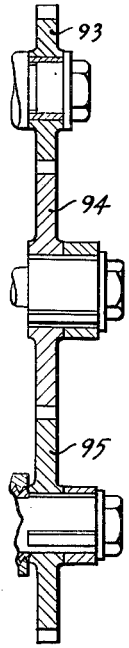
INVENTOR.
CARL A. BOEHM
BY H. K. Parsons & C. W. Wright
ATTORNEYS

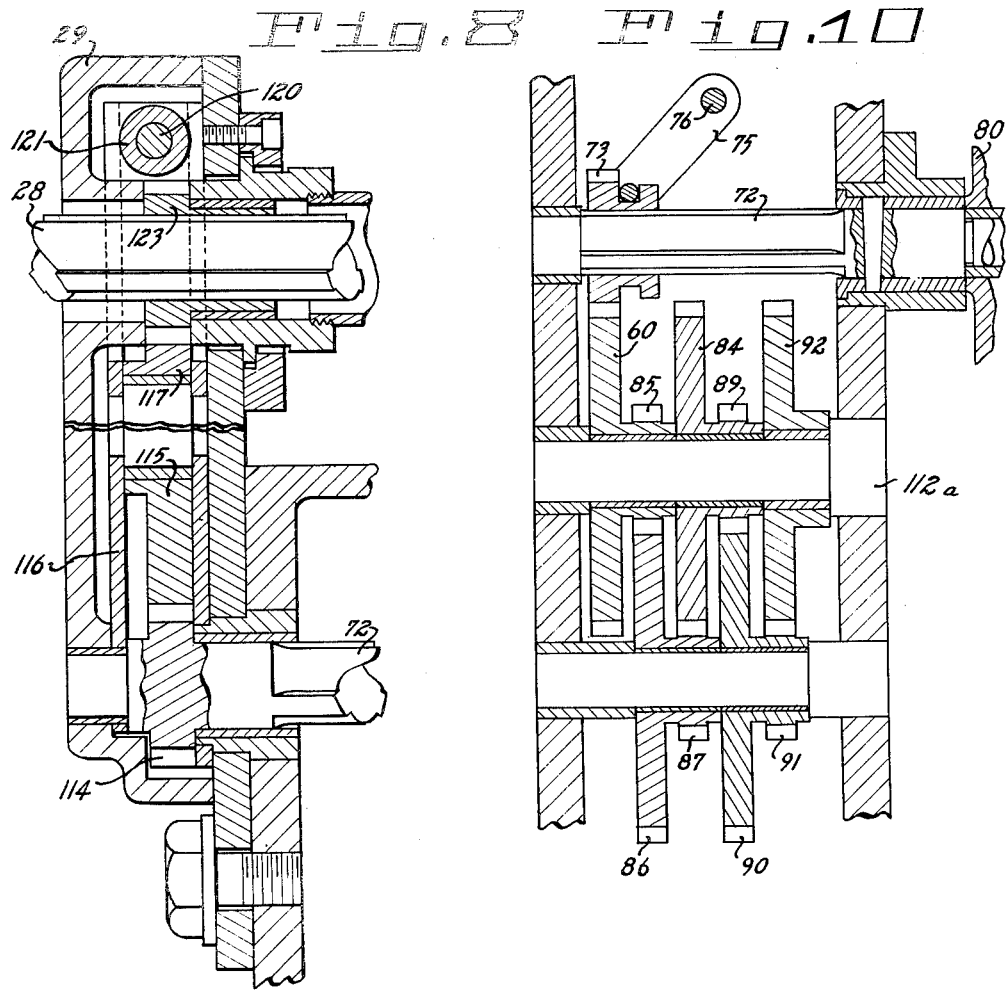
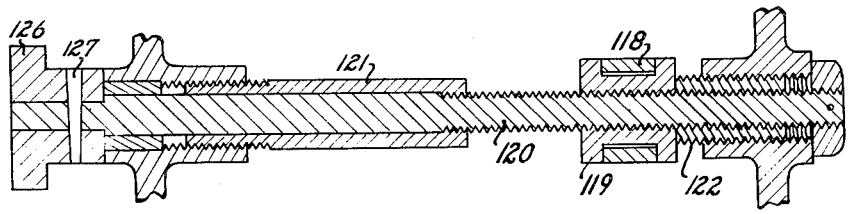

Dec. 23, 1952 — C. A. BOEHM — 2,622,454
AUXILIARY TRANSMISSION MECHANISM FOR MILLING MACHINES
Filed Aug. 9, 1950 — 7 Sheets-Sheet 7

INVENTOR.
CARL A. BOEHM
BY H. H. Parsons & E. W. Wright.
ATTORNEYS

Patented Dec. 23, 1952

2,622,454

UNITED STATES PATENT OFFICE 2,622,454

AUXILIARY TRANSMISSION MECHANISM FOR MILLING MACHINES

Carl A. Boehm, Cincinnati, Ohio, assignor to The Cincinnati Milling Machine Co., Cincinnati, Ohio, a corporation of Ohio Application August 9, 1950, Serial No. 178,512

4 Claims. (Cl. 74—665)

1

This invention relates to improvements in milling machines and has particular reference to an auxiliary ratio determining drive mechanism for use in conjunction therewith.

One of the principal objects of the invention is the provision of an improved transmission constructed for utilization of the normal actuating power of the machine tool to which it is applied embodying variable ratio transmissions respectively utilizable for determination of the rate of translation and rate of rotation of the work piece whereby a controlled helical path of desired lead may be readily formed on the work piece during the machining operation.

An additional object of the present invention is the provision in a structure of this character of an improved mechanism in which by utilization of a minimum number of gears and gear contacts an extremely high range of relative speeds of rotation between the work translating mechanism and the work rotating mechanism may be readily and efficiently effected.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 3 is an enlarged front view of the auxiliary transmission housing unit.

Figure 4 is a transverse sectional view on the line 4—4 of Figure 3.

Figure 5 is a schematic representation of a conventional machine tool drive mechanism utilizable as a power source.

Figure 6 is a vertical sectional view on the line 6—6 of Figure 3.

Figure 7 is an extended sectional view taken substantially on the line 7—7 of Figure 6.

Figure 8 is a sectional view on the line 8—8 of Figure 4.

Figure 9 is a sectional view of a modified form of change gearing shown in Figures 7 and 12.

Figure 10 is a sectional view as on the line 10—10 of Figure 6.

Figure 11 is a section of the reverser adjusting device on the line 11—11 of Figure 4, and

2

Figure 12:
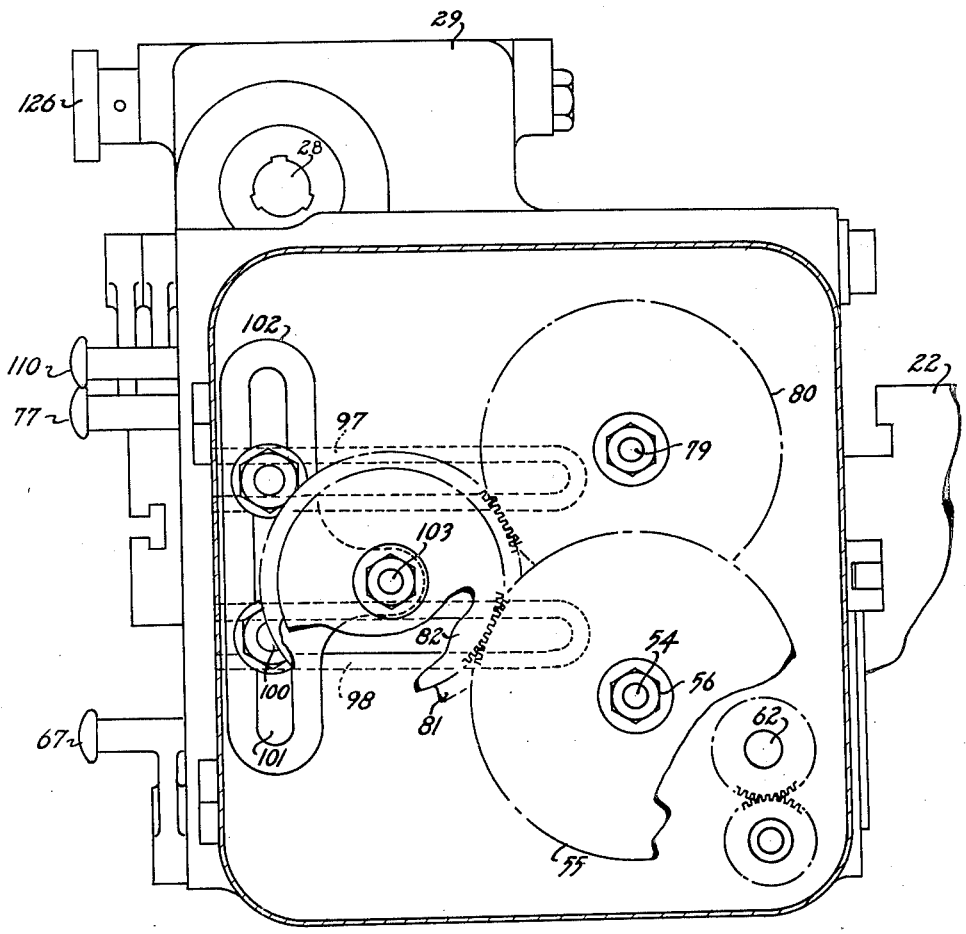

Figure 12 is a section on the line 12—12 of Figure 3, illustrating the relationship of the pick-off gear mechanism.

In the drawings the numeral 20 designates the column of a machine tool such as a milling machine of the conventional knee and column type having the vertically adjustable saddle 21 carrying the longitudinal translatable table 22 provided with a work piece support as at 23 and an additional dividing head support 24 through which rotary motion may be imparted to the work piece 25. Additionally carried by the column 20 is a spindle 26 provided with a tool or cutter 27 for operation upon the work piece.

It will be understood that these parts are conventionally shown as suitable for effecting respectively longitudinal relative translation between the work piece and the cutter and for additionally effecting relative rotation between the work piece and said carrier so that a helix thread or like configuration of desired lead may be produced on the work piece. A spline shaft 28 serves as the means for effecting power rotation of the dividing head mechanism, said shaft connecting the dividing head with the auxiliary transmission housing 29 suitably secured to the right hand end of the table 22.

Figure 1:
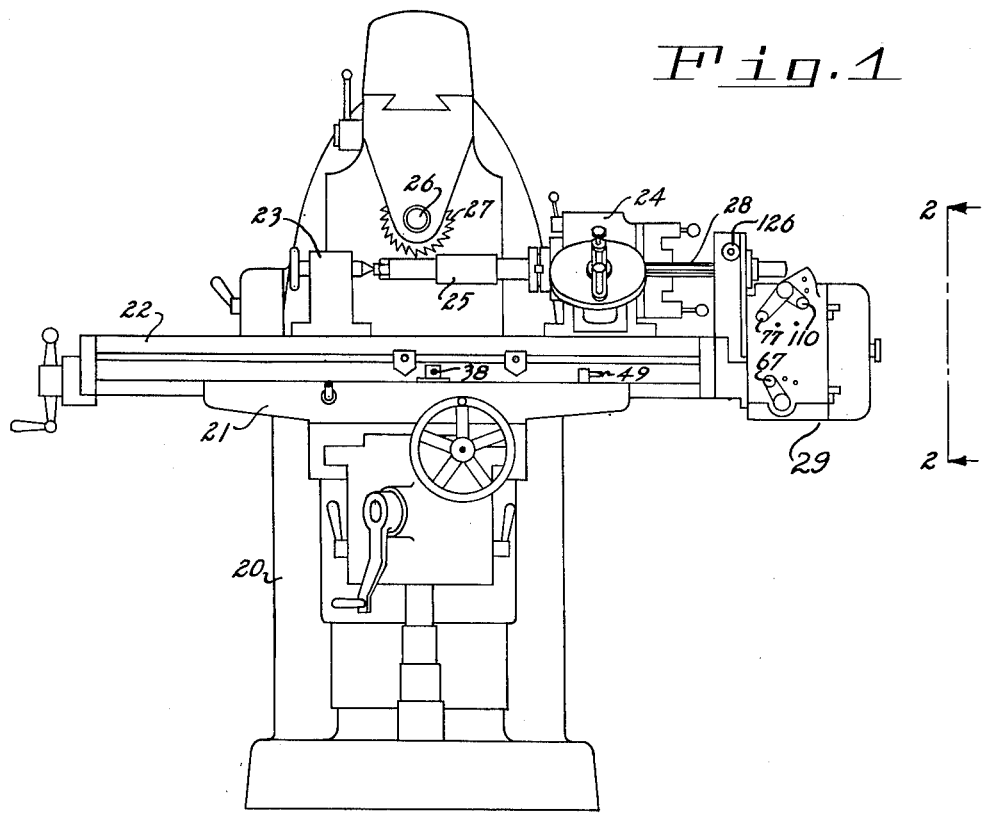
Figure 1 is a front elevation of a machine embodying the present invention.
Figure 2:
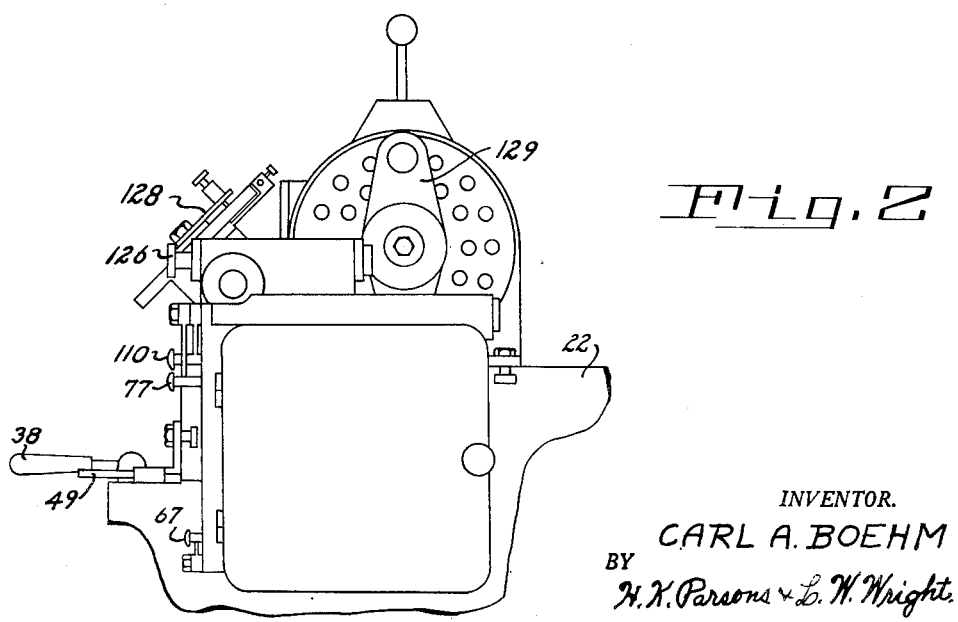
Figure 2 is an enlarged fragmentary end view thereof.

The particular transmission utilized to produce a driving power for the present auxiliary transmission is preferably of a conventional variable speed type as employed in milling machines or like machine tools, and is, therefore, illustrated only to the extent of the terminal driven shaft 30, Figure 5, journaled in the saddle 21 of the machine and provided with the bevel gear 31 meshing with the respective pinions 32 and 33 likewise rotatably mounted in the bearings 34 and 35 on the saddle of the machine. An intermediate clutch 36 is slidably splined to the sleeve or bushing 37 carried by said bearings and is movable by the shifter lever 38 having a fork 39 engaging the clutch. In the position of the parts shown in Figures 1 and 5, this clutch element is in its central or neutral position so that the pinions 32 and 33 may freely rotate.

When shifted to the left, pinion 32 will then, through the clutch, drive or rotate the sleeve 37 in one direction while, if shifted to the right, pinion 33 will drive the sleeve in the opposite direction, the structure in question thus providing a first reverser in the transmission trains. Rotatably but non-translatably secured to the table 22 is a lead screw 40 in threaded engagement with a nut 41 carried by the saddle 21 so that rotation of the screw in either direction will effect corresponding translatory movement of the table with respect to the saddle.

Additionally, rotatably mounted in the table and paralleling the lead screw is a shaft 42 having keyed thereon gear 43 meshing with a second gear 44 coupled as by clutch face 45 with the right hand end of sleeve 37 for rotation therewith. This gear is provided with a clutch face 46 engageable by the clutch 47 splined as at 48 to the lead screw 40. In the position shown in Figure 5 this clutch is in its neutral or disengaged position, but it may be moved by the shift lever 49 into engagement with the clutch teeth 46 for direct drive of the lead screw from sleeve 37 when desired as for the performance of ordinary milling operations when use is not made of the auxiliary transmission.

The general arrangement of the auxiliary transmission gearing is illustrated in Figure 7. It will be noted that the lead screw 40 is provided with a splined portion or primary power output shaft 50 extending into the housing unit 29. Mounted upon this extension 50 of the lead screw is the internally splined sleeve 51. Fitting into the outer end of the sleeve 51 is the spline stub shaft 52 secured to the sleeve for rotation therewith by a taper pin 53. This shaft is additionally splined as at 54 to receive pick-off gear 55 secured in position by nut 56.

Rotatably mounted on bushing 57 carried by the sleeve 51 is a translatable or shiftable power transmitting pinion and clutch unit 58 having at its left hand end the pinion 59 shown as interfitting with gear 60 of the decimal variator cluster unit, more particularly illustrated in detail in Figure 10. In the position shown, this pinion also meshes with pinion 60 on shaft 61 which is coupled by a clutch device 63 with the power input shaft 42. In this manner drive is imparted from shaft 42 by way of pinion 61, and pinion 59 to gear 60.

Member 58 is provided with shifter groove 64 engageable by the clutch shifter arm 65 secured on shaft 66 which extends through the front of the casing 29 and carries the operating lever 67. When the lever 67 is in its left hand position as shown in Figure 3, the gear 59 will be in the meshing position indicated in Figure 7. Movement of the lever 67 to the position 68, Figure 3, will move shifter 65 and unit 58 until gear 59 is out of mesh with 60 while remaining in driving relation with 61. This establishes a neutral condition in which no driving action is transmitted from shaft 42 to remainder of the transmission.

Movement, however, of the lever 67 to the third position 69 is effective to engage the clutch teeth 70 on unit 58 with the mating teeth 71 on the sleeve 51 effecting direct drive to the lead screw 40.

The potentially utilizable drive connections from gear 60 are particularly illustrated in Figure 6. From this figure it will be noted that there is provided the spline shaft 72 on which is translatably mounted the pinion 73 having a spool portion 74 engaged by shifter yoke 75 on rod 76 which projects outwardly from the housing and bears on its forward projecting end the control lever 77. When this lever is in the position indicated by 78, the pinion is in the left hand position shown in Figure 7, transmitting drive from 72 and stub shaft 79 to pick-off gear 80 and thence through the pick-off gear couplet 81—82 to gear 55 and lead screw 40. If the lever 77 is moved to the intermediate position 83 it will then be in mesh with gear 84, Figure 10, to which drive is imparted through pinion 85 integral with gear 60 and gear 86 integral with pinion 87 meshing with gear 84. In the example shown, this results in a speed decrease of ten to one between the rate of drive of shaft 72 when the pinion is meshing with the gear 60 and the rate effectable when the pinion is meshing with gear 84. Similarly, when lever 78 is moved to position 88 the drive effected is through pinion 89 integral with 84, gear 90 and its integral pinion 91 to gear 92 which is then in mesh with 73. This again results in a ten to one decrease of the rate of drive of shaft 72 over that effected by gear 84 or one one-hundredth of the rate effected when 60 and 73 are in mesh.

It will be noted that the various gear relationships shown are such that there is a progressive decrease in the rate transmitted from the power input shaft 42 to the rate of rotation effected of the lead screw 40. This principal is also followed as respects the ratio of the change gear train as particularly illustrated in connection with Figure 12. It will be understood that in a mechanism of this sort, either an organized variable speed transmission, or for simplification and economy of space, an appreciable series of pick-off or change gears, as for example the pick-off gears 93, 94, and 95, may be utilized. By use of such gears practically any desired variation may be attained between the initial rate of rotation imparted to the spline shaft 72 and the ultimate output rate of the lead screw 40 intermediate the series reductions effectable by movement of the pinion 73.

To facilitate ready interfitting of the varying sizes of change gears in proper driving relationship, the frame element 96 is perferably provided with T slots as at 97 and at 98 to receive T bolts 99 and 100 engaged in the slot 101 of the gear supporting bracket 102. This bracket carries stud 103 for mounting of the couplet 81, 82, or, alternatively, gear 94, and provides a ready means of adjustment in two directions, that is, laterally and vertically as viewed in Figure 12 to insure proper meshing relationship between this intermediate gear and the other pick-off gears of the drive.

In the drive train as just described it will be noted that the direction of drive is downward through the change gears to the lead screw for determination of desired rate of translation of the unit and work holding table 22.

At the same time, and for establishing of the desired ratio between translatory and rotary movement of the work piece 25, an additional or branch transmission is provided for actuation of the second power output or dividing head spline shaft 28. This transmission includes the spline shaft 104 bearing pinion 105 having a spool 106 engaged by the shifter 107 on arm 108. This arm is carried by sleeve 109 projecting forwardly from the unit housing and terminating in the adjusting lever 110. This lever has three positions of adjustment, namely, that shown at 111 in full lines in Figure 3 and the potential positions 112 and 113. When the lever is in 111 position, the pinion will be at the left as shown in Figure 7, the center distances of shaft 112a carrying the decimal gear set and shaft 104 carrying the pinion being such as shown in Figure 6 that the pinion may be selectively moved into intermeshing engagement with either of gears 60, 84, or 92 for effecting relative high, medium, or slow rates of rotation of the shaft 104. Shaft 104 is additionally provided with a second pinion 114 in mesh with the idler gear 115 carried by swinging bracket 116, Figure 8, which also carries the reverser pinion 117 in mesh with idler 115. This swinging frame or bracket terminates in a lug 118, Figure 4, fitting in a groove in the shifter nut 119 carried by screw 120 supported for rotation but against translation in the exteriorly threaded abutment sleeves 121 and 122. When the shifter 119 is in its right hand position, as shown in Figure 4, pinion 117 is in driving engagement with the pinion or gear 123 on the dividing head spline shaft 28, abutment 122 being adjusted to limit right hand movement of shifter 119 and being secured in such adjusted position as by the lock screw 124. This serves to effect right hand rotation of the spline shaft and dividing head. When the table and associated parts are moving toward the left, if it is desired that the rotation of the dividing head be in a left hand or counterclockwise direction instead of a right hand direction screw 120 is rotated to move the shifter 119, swinging the bracket forward so that gear 115 is in direct mesh with gear 123 to a limit determined by position of abutment screw 121.

There has thus been provided a simple, independent reverser for change of direction of rotation of the dividing head driving shaft 28 as respects the general direction of operation of the parts determinable by positioning of the reverser 36.

Clamp screw 124 may be tightened against hub 125 of the rotatable knob 126 pinned as at 127 to the adjusting screw 120 to secure the screw and thus the shifting parts in desired position.

The directional drive thus determined is transmitted through the spline shaft 28 to the dividing head unit 24 which includes a fine adjustment or setting mechanism, as indicated at 128 and rapid indexing mechanism indicated at 129.

In the primary utilization of the transmission just described, the lever 110 is maintained at the position of adjustment indicated by the numeral 111, insuring a constant relative rate of drive through the spine shaft 28 to the dividing head. The lever 77 is placed in the position indicated by reference character 88 so that pinion 73 as in mesh with gear 92, imparting the slowest available rate of drive. Assuming that the lead of the thread 130 of the lead screw 40 is ¼", by proper selection of the transmission or pick-off gear series a ten to one to one to one ratio of drive may be effected between the shaft 72 and the lead screw so that any ratio between one one hundredth (.01") of an inch advance or translation of the work will be effected for 360 degree rotation of the work piece to a maximum of one $\frac{1}{10}$ (.1) of an inch advance per revolution.

Movement of the lever 77 from the 88 position to the 83 position, shifting the pinion 73 from mesh with gear 92 into mesh with gear 84 will increase by a multiple of ten the ratio between advance of the work piece and rotation of the work piece so that in this position with corresponding employment of the change or pick-off gears any lead between $\frac{1}{10}$ of an inch and 1" may be effected. Similarly, movement of the lever 77 to the 78 position, meshing pinion 73 with gear 60, will again step up the relative relationships by a factor of ten for attainment of lead values from one inch to ten inches.

When leads above 10" are desired, utilization is made of the same gearing as heretofore described but in a different manner.

In this utilization the pinion 73 may remain at all times in mesh with the gear 60, the control lever 77 remaining in the 78 position. Lever 67, however, is now moved from the left hand position as illustrated in Figure 3 to its right hand position as indicated by the numeral 69. In this position the pinion 59 is shifted to the right until it clears and is out of mesh with gear 60 interrupting any driving connection between the power input or spline shaft 42 and the decimal variator gearing including the elements 60, 84, 92. This movement, however, intermeshes clutch teeth 70 on member 58 with clutch teeth 71 so that the shaft 40 is now directly driven from the shaft 42, the gear relationships between the members 44, 43 and 59, 60a being such that there is preferably substantially a one to one ratio so that the rate of rotation of the lead screw 40 will have a definite relation to the feed rate controls of the conventional milling machine with which the mechanism is employed and during subsequent utilization the changes in rate of rotation of the feed screw will only be such as are determined by said feed mechanism.

For basic utilization of this phase of the invention the same series of change or pick-off gears, as previously utilized, may be employed, but preferably in reverse relationship in that the smaller gear or pinion, such as 80, is now mounted on the shaft 52 while the larger gear of the series, such as 55, is placed on the shaft 79. This is for effecting a constant step-down transmission drive from shaft 52 which now becomes the power transmitting shaft in place of shaft 79 as previously.

This relationship will, therefore, effect a variable decrease in the rate of rotation transmittable through the several gear and pinion connections to the spline shaft 28 and thus to the dividing head. For attaining leads between 10" and 100" the lever 110 remains in its previous 111 position or with the pinion 105 interengaged with the more rapidly rotating drive gear 60, the intermediate rate variations being secured as before by suitable substitutions in the change gear series. To increase the lead to the range 100" to 1000" lever 110 is moved to the 112 position so that pinion 105 meshes with gear 84, thus slowing down by a multiple of 10 the preceding speeds, while for the range of 1000" to 10,000" lever 110 is further shifted to the 113 position so that 105 meshes with the still slower operating gear 92, again slowing down by a multiple of 10 the rate of rotation of the dividing head.

By this double utilization of the improved simplified dividing head or attachment drive forming the subject of the present invention, it should be evident that any desired lead within the range of $\frac{1}{100}$ of an inch to 10,000 inches can be readily accurately attained by use of a single power input member and an alternative direct drive or split drive transmission system avoiding the necessity of any speeding up gear trains but on the contrary preferably employing throughout speed reducing transmissions enhancing the accuracy of result accomplishable while minimizing the power requirement for satisfactory operation.

It will further be noted that the entire transmission is so constructed as to be readily applicable to and utilizable in connection with existing commercial milling machines embodying reverser controlled lead screw constructions with associated attachment drive shafts such as the shaft 42 indicated in Figure 5.

It will further be apparent that by placing lever 67 in its intermediate or neutral position 68, pinion 59 will be moved out of mesh with or free of gear 60 while the clutch elements 70, 71 will also be out of engagement, leaving the lead screw entirely free for rotation so that it may then be connected by clutch 47 directly with clutch 46 on sleeve 37, permitting direct drive of the lead screw for normal milling machine operations without the necessity of in any way disconnecting or removing the auxiliary drive transmission attachment from the machine.

What is claimed is:

1. A ratio determining drive mechanism for machine tools including a housing, a power input shaft and a pair of power output shafts associated with said housing, and a transmission intervening said shafts including a plurality of gears of equal diameter and intervening gearing for operating said equal diameter gears at different rates, a pinion shaft adjacent said gears, a pinion shiftably splined on said shaft and selectively engageable with one or the other of said gears whereby the pinion and its shaft will be operated at variable rates, additional gearing interconnecting the pinion shaft and one of the power output shafts, a second pinion shaft, a second pinion selectively engageable with the said gears of equal diameter for actuation thereby at variable rates, additional gearing interconnecting said second pinion shaft and the other of said output shafts of the unit, and a shiftable power transmitting element movable to connect and disconnect the power shaft in direct driving relation to the transmission including the common diameter gears, said element having a clutch portion alternatively shiftable to effect direct drive of the first-mentioned power output shaft and through said shaft and the said interconnecting gearing to the transmission.

2. A ratio determining drive mechanism for machine tools including a housing, a power input shaft and a pair of power output shafts associated with said housing, and a transmission intervening said shafts including a plurality of gears of equal diameter and intervening gearing for operating said equal diameter gears at different rates, a pinion shaft adjacent said gears, a pinion shiftably splined on said shaft and selectively engageable with one or the other of said gears whereby the pinion and its shaft will be operated at variable rates, additional gearing interconnecting the pinion shaft and one of the power output shafts, a second pinion shaft, a second pinion selectively engageable with the said gears of equal diameter for actuation thereby at variable rates, additional gearing interconnecting said second pinion shaft and the other of said output shafts of the unit, a shiftable power transmitting element movable to connect and disconnect the power shaft in direct driving relation to the transmission including the common diameter gears, said element having a clutch portion alternatively shiftable to effect direct drive of the first-mentioned power output shaft and through said shaft and the said interconnecting gearing to the transmission, and means for moving said element into an intermediate neutral position, rendering the power input shaft ineffective for transmission operation.

3. A ratio determining drive mechanism for machine tools including a housing, a power input shaft and a pair of power output shafts associated with said housing, and a transmission intervening said shafts including a plurality of gears of equal diameter and intervening gearing for operating said equal diameter gears at different rates, a pinion shaft adjacent said gears, a pinion shiftably splined on said shaft and selectively engageable with one or the other of said gears whereby the pinion and its shaft will be operated at variable rates, additional gearing interconnecting the pinion shaft and one of the power output shafts, a second pinion shaft, a second pinion selectively engageable with the said gears of equal diameter for actuation thereby at variable rates, additional gearing interconnecting said second pinion shaft and the other of said output shafts of the unit, and a shiftable power transmitting element movable to connect and disconnect the power shaft in direct driving relation to the transmission including the common diameter gears, said element having a clutch portion alternatively shiftable to effect direct drive of the first-mentioned power output shaft and through said shaft and the said interconnecting gearing to the transmission, said additional gearing including a variable speed transmission adjustable to effect incremental changes in the relative rates of actuation of the pinion shaft and first-mentioned power output shaft irrespective of the manner of actuation of said power output shaft.

4. A ratio determining drive mechanism for machine tools including a housing, a power input shaft, a pair of power output shafts carried by the housing, and transmission means within the housing for determining the relative rates of actuation of said power output shafts comprising a primary transmission including a plurality of gears, interconnecting drive elements for effecting definite ratios of relative rotation of said gears, a first shaft carrying a pinion selectively engageable with said gears, a variable speed transmission connecting said shaft with the first power output shaft, a second shaft carrying a pinion independently selectively engageable with said gears, means coupling said second shaft with the second power output shaft, and selector means intervening the transmission and the power input shaft having a first position effective to transmit power through said gears and variable speed transmission to the first power output shaft and having a second position effective for direct actuation of said first power output shaft and actuation of the variable speed gears by way of said second power output shaft and variable speed transmission.

CARL A. BOEHM.

REFERENCES CITED

The following references are of record in the file of this patent:

UNITED STATES PATENTS

| Number | Name | Date |
|---|---|---|
| 912,609 | Perrine | Feb. 16, 1909 |
| 1,145,236 | Fay | July 6, 1915 |
| 1,922,633 | Parsons | Aug. 15, 1933 |
| 1,966,699 | Armitage | July 17, 1934 |
| 2,002,816 | Isler | May 28, 1935 |
| 2,011,000 | Kingsbury | Aug. 13, 1935 |
| 2,163,507 | Walchek | June 20, 1939 |
| 2,504,443 | Nenninger et al. | Apr. 18, 1950 |